United States Patent [19]
Huang

[11] 3,958,982
[45] May 25, 1976

[54] ALUMINUM EXTRACTION PROCESS

[76] Inventor: Wen H. Huang, 803 Attache Court, Tampa, Fla. 33601

[22] Filed: Dec. 12, 1974

[21] Appl. No.: 532,166

[52] U.S. Cl. .......................... 75/101 R; 75/101 BE; 75/121; 423/112; 423/132; 423/629
[51] Int. Cl.² .......................................... C22B 21/00
[58] Field of Search ............ 75/101 BE, 101 R, 121; 423/112, 132, 629

[56] References Cited
UNITED STATES PATENTS

| | | | |
|---|---|---|---|
| 2,408,241 | 9/1946 | Sturbelle | 75/101 R |
| 3,511,645 | 5/1970 | Goni | 75/101 R |
| 3,527,599 | 9/1970 | Jangg | 75/101 R |
| 3,697,400 | 10/1972 | Pang | 75/101 R X |
| 3,778,252 | 12/1973 | Wilson | 75/101 R |

Primary Examiner—G. Ozaki
Attorney, Agent, or Firm—Stein, Orman & Pettis

[57] ABSTRACT

A process for the extraction and recovery of aluminum from aluminum-containing raw materials by contacting said raw materials with fruit juices and complexing organic acids.

8 Claims, 1 Drawing Figure

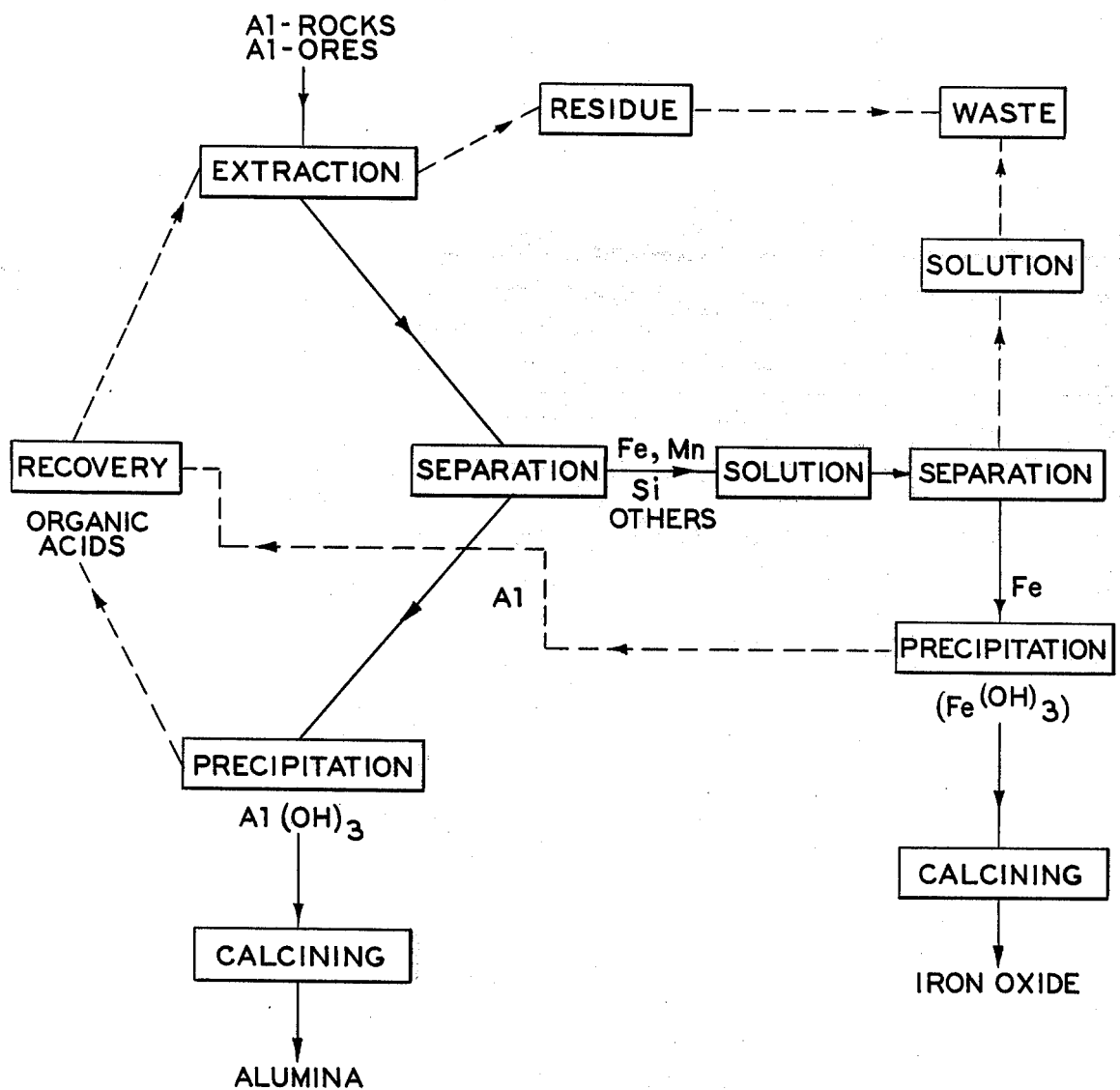

ALUMINUM EXTRACTION PROCESS

BACKGROUND OF THE INVENTION

1. Field of the Invention

This invention relates to a unique process for extracting and recovering aluminum from aluminum-containing raw materials, including low-grade ores, by contacting said ores with an aluminum-organo complex-forming reagent at a temperature up to 150° C for a predetermined period of time.

2. Description of the Prior Art

As the domestic demand for aluminum metal continually increases at a greater rate than the supply, new and improved technology for mineral processing must be developed to increase the production of aluminum. Aluminum has been extracted and recovered commercially for 86 years by the Bayer process, which is actually applicable only to high quality bauxite ores. Despite recent modifications of the Bayer process, it still presents several shortcomings.

First, the process is only capable of extracting aluminum from hydrated aluminum oxide ore minerals, such as gibbsite and boehmite, but it is incapable of recovering aluminum from other types of potential ores such as anorthosite and clays. Therefore, aluminum in kaolins which are frequently associated with bauxites, or aluminum present in goethite is not extractable under the digestion conditions of the Bayer process. For example, in highly bauxitic goethite, the unextractable alumina is often found to be as high as 5%, by weight, of the bauxite.

Second, bauxites containing an excess of 5% silica in other minerals are not considered suitable for direct processing by the Bayer method, because of the high cost of removing silica in digestion so as to prevent contamination in the aluminum production. Third, the simultaneous presence of boehmite and gibbsite in most ores always poses a problem in controlling the digestion conditions of the process to better recover aluminum from the mixture of both these minerals.

Fourth, the presence of very fine particle sizes of the bauxite and the resulting red mud (iron oxides, titania and silica) makes it difficult to efficiently separate the red mud from the caustic aluminate liquor. Although a floculation-decanting technique may be used for this separation, the high content of organic matter in certain bauxites inhibits floculation of the red mud, and hence contaminates process liquors. Finally, the disposal of red muds in alumina production is a well-recognized environmental problem facing the processing plants. These and other related problems in the Bayer process point out a need for new technology of extraction and separation in order to economically utilize all bauxite materials and other aluminum-containing raw materials.

That is to say, such a new and improved technology should not only recover aluminum more efficiently from bauxite materials — 95% of which are imported in the United States — than the current Bayer process, but also should be applicable to the extraction of aluminum from low-grade ores such as anorthosite, alunite and clays which are abundant.

SUMMARY OF THE INVENTION

The present invention relates to a unique process whereby aluminum may be efficiently and economically recovered from low-grade ores, which were heretofore considered unsuitable for commercial processes. Most simply stated, the process basically comprises four steps.

First, the aluminum-containing raw material is contacted with a predetermined reagent solution to form an extraction solution containing an aluminum-organo complex. Obviously, then, the reagent solution is selected for its ability to form such aluminum-organo complexes. This extraction reaction is expressed generally by the following equation:

Raw material (Al)+$H_xOR$+$nH^+$=1$AlOR^{m+}$ +$kH_4Si$-$O_4$+$rCa^{2+}$+$sNa^+$+$tH_2O$+$uFeOR^{t+}$+$K^+$+other metal complexes wherein $H_xOR$ is the complexing reagent and $AlOR^{m+}$ is the aluminum-organo complex.

MOre specifically, the complexing reagent may comprise a dilute complexing organic acid solution, such as 0.01–5.0 M citric, tartaric and salicylic acids. Additionally, because the peels, pulps and juices of numerous fruits, such as oranges, tangerines, grapefruits, lemons and apples, contain appreciable amounts of organic acids — citric, malic, oxalic, tartaric, benzoic, succinic, quinic and/or amino — such juices may also be used as the complexing reagent. The use of such juices as the complexing reagent will be explained in more detail hereinafter. Regardless of the precise nature of the complexing reagent utilized, the extraction step of the present invention is conducted at a temperature up to 150° C for a predetermined period of time, preferably less than 24 hours.

The second step of the process of the present invention comprises separating the aluminum-organo complex-containing solution from the residue of the extraction step. This is best accomplished by filtration.

In the third step of the present invention, the aluminum in the extracted solution is recovered as an aluminum hydroxide precipitate by increasing the pH of the solution after heating the filtrate at about 170° C for about 3 hours. Other impurities, such as calcium and sodium which may be present in the filtrate can be avoided by conducting the precipitation reaction at a predetermined pH so that these impurities remain in solution. It should also be noted that by changing the oxidation potential (Eh), or heating the filtrate in sulphuric acid solution at approximately 90° C, the aluminum-organo complex will become unstable and break down, thereby allowing aluminum to be recovered. In any event, it should be noted that the original complexing agent may be a by-product of the precipitation. Obviously, this enhances the commercial feasibility of the present invention, for the complexing reagent thereby obtained may be reused in the initial extraction step.

In the final step of the process, the aluminum is recovered as alumina by calcination of the aluminum hydroxide. Alternatively, the aluminum may be recovered by electrolysis.

Having thus set forth the fundamental steps of the process of the present invention, certain advantages should be noted. The extraction of aluminum by forming aluminum-organo complexes is workable for mixtures of gibbsite and boehmite in most bauxites, which is not feasible for extraction by the Bayer process. Moreover, aluminum from goethite may also be extracted. Accordingly, the process of this invention will greatly enhance the availability of aluminum without increasing its cost. It has also been determined that the extraction of aluminum in accord with the present process is facilitated and accelerated by the use of very fine particle sizes in the beginning raw materials, which has always posed a problem of separation by the Bayer process. Because silicon is not complexed by the reagent solution of the present invention, the extraction of aluminum is not affected by the presence of impurities such as silica and titania. The differences in the nature and properties of complexing of chelation of aluminum, iron, manganese and other heavy elements during the extraction of raw materials facilitates separation of aluminum from these other elements, and possibly would allow the recovery of by-products of iron and manganese during the process. The reactions employed minimize the amount of red mud and eliminate the corresponding disposal problem of the mud present in the Bayer process. Finally, the use of a complexing reagent solution in aluminum extraction provides an additional benefit in the form of energy conservation. For example, the temperature required for digestion by the Bayer process is about 150° C for gibbsite, and about 243° for boehmite. Quite significantly, the instant complexing extraction is preferably conducted at a temperature of about 100° C. The use of complexing reagent solutions therefore will promote overall production of aluminum at reduced energy consumption levels. Of course it should also be noted that the process of the present invention may be even further enhanced by the use of catalysts, by regulating the pressure at which the various reactions are conducted, by selecting reagent solutions of a predetermined pH, and by reducing the grain size of raw materials.

The invention accordingly comprises the several steps, and the relation of one or more of such steps with respect to each of the others thereof, which will be exemplified in the process hereinafter disclosed, and the scope of the invention will be indicated in the claims.

BRIEF DESCRIPTION OF THE DRAWINGS

For a fuller understanding of the nature of the invention, reference should be had to the following examples taken in connection with the accompanying drawing showing a schematic flow diagram according to which the process can be conducted.

DETAILED DESCRIPTION

As shown in the accompanying flow sheet, the process of the present invention comprises extracting aluminum-containing raw material with an aluminum-organo complex-forming reagent, separating the solution containing the aluminum-organo complex from the resultant residue, breaking down the aluminum-organo complex to yield aluminum hydroxide precipitate and possibly the original complexing reagent, and calcinating the aluminum hydroxide precipitate to yield the final aluminum product, alumina. As clearly shown in the flow sheet, the complexing reagent recovered at the precipitation step may be recycled for use in the initial extraction step. Also, as shown by the flow sheet, it is further contemplated that the process of the present invention may also be utilized for the recovery of iron oxide as a by-product.

The examples which follow report the results of the extraction of aluminum from raw materials, for example Arkansas bauxite, by different juices and pure complexing organic acids at various temperatures. Each of the juices utilized is prepared by diluting four-fold concentrated juice, such as frozen concentrate for consumer use, (approximately 6 ounces or 177 ml) to 250 ml with deionized water. The strength of the complexing organic acids is expressed in molarity.

EXAMPLE I

In order to determine the effects of reagent strength and temperature on the process of the present invention, the following procedure is followed. Individual bauxite samples are extracted with orange juice, grapefruit juice, citric acid, tartaric acid, and salicylic acid. Two extractions are conducted with each singular complexing acid: the first at 1.0 molar concentration, and the second at 0.01 molar concentration. Additionally, a first series of extractions is conducted at 25° C, and a second series of extractions is conducted at 88° C. Extraction time is 5 hours. Following extraction, each individual aluminum-organo complex-containing solution is separated from the extract residue. The results of the weight percent aluminum in this experiment may be tabulated as follows:

|   | | | $H_3Cit$ | $H_2Tart$ | $H_2Sal$ | Orange Juice | Grapefruit Juice |
|---|---|---|---|---|---|---|---|
| 1 | M | at 25°C | 0.45% | 0.68% | — | — | — |
| 1 | M | at 88°C | 13.9 % | 12.7 % | — | — | — |
| 0.01M | | at 25°C | 0.36% | 0.67% | 0.2% | — | — |
| 0.01M | | at 88°C | 2.9 % | 2.4 % | 2.8% | — | — |
| 0.05M | | at 25°C | — | — | — | 0.03% | 0.03% |
| 0.05M | | at 88°C | — | — | — | 9.9 % | 9.9 % |

As shown by these results, at 25° C the effect of acid strength of reagent solutions is not significant. However, at 88° C the effect is noticeable. One molar solutions extracted aluminum more than did 0.01 molar solutions at 88° C by factors of up to 5. Of particular note is that at 88° C the extraction of aluminum by orange and grapefruit juices increases by a factor of 300 over that conducted at 25° C. Although citric and tartaric acids (1M) have higher acid strengths than dilute orange (0.05M) and grapefruit (0.05M) juices, the extraction of aluminum from bauxite by acids is not significantly different from that by juices. This clearly indicates that organic acids other than just the citric acids in these citrus juices also extracted aluminum quite effectively from the bauxite.

EXAMPLE II

The following procedure may be utilized to determine the effect of time of extraction in the process of the present invention. Individual samples of bauxite are extracted with 1M citric acid, dilute lemon juice (approximately 0.2M), and dilute orange juice (approximately 0.05M). At predetermined time intervals the percent aluminum extracted was measured with the following results:

TABLE

|  | $H_3Cit$ | Orange Juice | Lemon Juice |
|---|---|---|---|
| 13 hrs | 21% | 10% | 13% |
| 25 hrs | 34% | 13% | 20.5% |
| 48 hrs | 48% | 24% | 32% |
| 87 hrs | 78% | — | — |

Obviously, the difference in percent aluminum extracted at a given time is due to acid strength. Nevertheless, since these juices contain acids other than pure citric acid, their use is believed to be more economical and beneficial than the pure citric acid in recovering aluminum on an industrial scale.

EXAMPLE III

In order to determine the effect of temperature on the extraction of aluminum from bauxite, the following procedure may be used. Individual samples of bauxite are extracted with dilute lemon juice (approximately 0.2M) at a temperature of 88° and at a temperature of 100° C for a period of 48 hours. At predetermined time intervals, the percent aluminum thus far extracted is determined. The result of this comparison test is given in the following table:

|  | 88°C | 100°C |
| --- | --- | --- |
| 6 hrs | 8% | 14% |
| 14 hrs | 13% | 25% |
| 25 hrs | 20% | 35% |
| 48 hrs | 32% | 58% |

As shown above, after 48 hours approximately 58% of the aluminum had been extracted at 100° C, whereas only 32% had been extracted by the same strength juice at 88° C. The increase of aluminum extraction is significant in providing useful information for determining parameters for aluminum extraction on an industrial scale.

As previously stated, extraction can also be conducted at temperatures as high as about 150° C. However, extraction at such temperatures is not preferable for two reasons. First, problems associated with vaporization of water are encountered. Second, conducting the process at such temperatures significantly adds to the energy input requirements, thereby detracting from its economic and environmental advantages. Thus, while the process can be run at a temperature as low as about 25° C and as high as about 150° C, an extraction temperature range of about 88°–100° C is preferred.

In summary, the results of these examples show that although dilute juices extracted aluminum from bauxite less than did the 1M citric, tartaric, or salicylic acids, the use of dilute juices appears to be most effective and economical in industrial scale extractions. The citrus juices, in order of decreasing effect of extraction, are lemon, grapefruit and orange. It is in fact anticipated that virtually any acidic fruit juice, including the pulp and peel thereof, may be used as the complexing reagent in the process of the present invention. If the cost of aluminum extraction in accord with the process of the present invention by lemon juice is established as 100, the cost of aluminum extraction by other reagents is as follows (on the basis of current market price):

| Reagents | Cost Factor |
| --- | --- |
| Lemon Juice | 100 |
| Orange Juice | 150 |
| Grapefruit Juice | 236 |
| Citric Acid | 264 |
| Tartaric Acid | 344 |

Once having selected the desired complexing reagent and having extracted the aluminum-containing raw material to form an aluminum-organo complex-containing solution, the aluminum-organo complex is separated from other elements present in the raw material, for example, from iron and silicon in bauxite and kaolins sodium, calcium and silicon in anorthosite, by precipitation and filtration. the aluminum-organo complex is recovered in the filtrate. If, for example, salicylic acid is used to extract aluminum from Jamaica bauxite at 25° C, the maximum amounts of impurities in the aluminum-organo complex-containing filtrate at pH 3 may be calculated as follows:

| Impurity | Maximum Percent, By Weight |
| --- | --- |
| Iron | 0.0054 (from goethite) |
| Iron | 0.0022 (from hematite) |
| Silicon | 0.033 (from quartz) |
| Silicon | 0.33 (from amorphous silica) |

Other impurities, such as calcium and sodium which are present in the extraction of anorthosite, are highly soluble. However, these impurities can also be separated from the aluminum-organo complex-containing filtrate by precipitation at a pH other than that for aluminum.

Having thus obtained a filtrate containing the aluminum-organo complex plus negligible impurities, all that remains is to recover the final product. Preferably, the aluminum is recovered as an aluminum hydroxide precipitate by buffering the filtrate at a high pH. For example, in a salicylic acid extraction process, the aluminum is precipitated as aluminum hydroxide at pH 9.1 and 25° C. Furthermore, by changing the oxidation potential or adding the organic reagent, or excess magnesium, or heating the filtrate at about 170° C, the aluminum-organo complex will become unstable and breaks down, allowing aluminum to be recovered. Of course, as previously stated, this precipitation reaction may also yield the original complexing reagent which may then be recycled for further use in extracting additional raw materials. By calcining the aluminum hydroxide the alumina final product may be obtained. Alternatively, aluminum may be recovered by electrolysis.

It will thus be seen that the objects set forth above, among those made apparent from the preceding description, are efficiently attained, and since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described,
What is claimed is:
1. A process for the extraction and recovery of aluminum from aluminum-containing raw materials, said process comprising:
   a. extracting aluminum-containing raw materials with a reagent selected from the group consisting of fruit juices and complexing organic acids at temperatures up to 150° C. for a predetermined period of time to form a solution containing an aluminum-organo complex;
   b. separating said solution from the resultant residue; and
   c. recovering the aluminum in the form of alumina from said aluminum-organo complex.

2. A process as in claim 1 wherein the recovery of said aluminum comprises:
   a. altering said solution to a predetermined pH to form an aluminum hydroxide precipitate and a recoverable solution of said reagent; and
   b. calcining said precipitate to obtain said alumina.

3. A process as in claim 1 wherein the recovery of said aluminum comprises:
   a. increasing the oxidation potential of said solution to break down said aluminum-organo complex to obtain an aluminum hydroxide precipitate and a recoverable solution of said reagent; and
   b. calcining said precipitate to obtain said alumina.

4. A process as in claim 1 further comprising grinding said raw materials to a relatively fine particle size prior to said extracting step.

5. A process as in claim 1 wherein said extracting step is conducted at 88°–100° C.

6. A process as in claim 1 wherein said reagent is selected from the group consisting of orange juice, tangerine juice, grapefruit juice, lemon juice, apple juice, citric acid, malic acid, oxalic acid, tartaric acid, benzoic acid, succinic acid, quinic acid, amino acid, and salicylic acid.

7. A process as in claim 1 wherein the strength of said reagent is about 0.01–5.0M.

8. A process as in claim 1 wherein said separating step comprises filtering said solution to obtain said aluminum-organo complex in the resultant filtrate.

* * * * *